United States Patent [19]
Gulick

[11] Patent Number: 5,298,921
[45] Date of Patent: Mar. 29, 1994

[54] SYSTEM FOR COMMUNICATING WITH EXTERNAL DEVICE REGISTERS VIA TWO-BYTE DATA PACKETS OVER A SERIAL BUS

[75] Inventor: Dale E. Gulick, Austin, Tex.

[73] Assignee: Advanced Micro Devices, Inc., Sunnyvale, Calif.

[21] Appl. No.: 589,380

[22] Filed: Sep. 27, 1990

[51] Int. Cl.$^5$ .......................... G06F 3/00; G06F 13/20
[52] U.S. Cl. ...................................... 395/325; 395/800; 379/93; 370/85.1; 364/222.3; 364/919.4; 364/DIG. 1
[58] Field of Search ................ 395/325; 370/55, 85.1; 364/DIG. 1, DIG. 2; 379/93

[56] References Cited

U.S. PATENT DOCUMENTS

| | | | |
|---|---|---|---|
| 4,698,766 | 10/1987 | Entwistle et al. | 364/468 |
| 4,868,784 | 9/1989 | Marshall et al. | 395/325 |
| 4,947,317 | 8/1990 | Digiulio et al. | 395/325 |

Primary Examiner—Thomas C. Lee
Assistant Examiner—Paul R. Lintz
Attorney, Agent, or Firm—Foley & Lardner

[57] ABSTRACT

A communication system provides communication over a serial bus between a microprocessor and an external device which includes a plurality of registers. The communication system includes a message generator within the microprocessor for generating unique register access messages which provide fast and efficient register access. The external device also includes a message generator which generates register access error messages and interrupt messages.

21 Claims, 4 Drawing Sheets

SYSTEM FOR COMMUNICATING WITH EXTERNAL DEVICE REGISTERS VIA TWO-BYTE DATA PACKETS OVER A SERIAL BUS

BACKGROUND OF THE INVENTION

The present invention generally relates to a communication system to provide efficient communication between a microprocessor and an external device over a serial bus. The present invention still more particularly relates to such a system which is implemented in integrated circuit form and wherein, through a new and improved register access message and system architecture, register reads and writes, error messages, and interrupt messages can be conducted between the microprocessor and the external device in an expedited manner over the serial bus. The communication system of the present invention disclosed herein is incorporated into a hands-free, multiple feature telephone unit adapted for use in an Integrated Services Digital Network (ISDN).

Systems wherein microprocessors operate in association with and require access to external devices are well known in the art. Such external devices may include one or more registers which the microprocessor must read data from or write data into. Such internal devices may also be the source of error messages or interrupt messages. In order for the overall system to function properly, the microprocessor must therefore be able to communicate with the external device to access registers and receive error and interrupt messages from the external devices.

Register access, error, and interrupt messages generally require multiple-bit messages to be conveyed between the microprocessor and the external device. In most applications and especially where integrated circuits are employed, it is not economically prudent to convey the bits of these messages between the microprocessor and the external device in parallel. To do so would result in an inordinately high cost due to such factors as the required multiple wire interconnection and the large number of required integrated circuit device terminal pins. With respect to this last mentioned factor, it is well known in the integrated circuit industry that the cost of producing an integrated circuit device increases as the number of required device terminal pins increases. Also, the number of device terminal pins is also related to the number of different functions that a device is to provide. Hence, it is advantageous to maintain the number of device terminal pins to a minimum while still affording a device with its complete and desired functionality.

In view of the foregoing, in multi-feature integrated circuit devices which are to be external to and or utilized in association with a microprocessor, a serial bus is often employed to provide multiple-bit messages to be sent from and received by the external device with respect to the microprocessor. This results in just two terminal pins and bus conductors being required, one for outgoing messages and one for incoming messages.

Unfortunately, in the prior art, communication system architectures and protocols have not made communication over serial buses between microprocessors and external devices very efficient. Such systems generally require a full, eight-bit byte to be conveyed just to define a particular operation such as a register access operation or to define a message as an interrupt or error messenger. Further, such systems have generally not provided multi-byte data access.

The present invention overcomes these disadvantages in the use of a serial bus between a microprocessor and an external device by requiring only a portion of an eight-bit byte to define an operation such as a register access operation or a message as an error or interrupt message. In addition, the system of the present invention utilizes a single message generator in the external device to generate read response, error, and interrupt messages. All of these types of messages are similarly formatted and placed onto the serial bus within the same predetermined channel. As a result, fast and efficient message transfer is obtained with a minimum amount of hardware.

SUMMARY OF THE INVENTION

The present invention therefore provides a communication system for use in a system of the type including a microprocessor and a device external to the processor, wherein the device has a multiple-bit address and includes a plurality of registers for storing bits of data, wherein each register has a unique multiple-bit address, and wherein the microprocessor is coupled to the external device by a serial bus. The communication system permits the microprocessor efficient access to the register of the external device and includes message generator means within the microprocessor for generating a register access message comprising first and second multiple-bit bytes. The first byte includes a first number of bits containing the multiple-bit address of the external device and a second number of bits identifying the messages as a register access message. The second byte includes a single bit identifying the message as a register read or register write message and a third plurality of bits defining the multiple-bit address of the register being accessed. The system further includes transmitting means coupled to the microprocessor for transmitting the first and second multiple-bit bytes in series over the serial bus, receiving means within the external device and coupled to the serial bus for receiving the register access message, and register access means coupled between the receiving means and the registers and responsive to the third plurality of bits for enabling the accessed register corresponding to the multiple-bit register address defined by the third plurality of bits.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings in the several figures of which like reference numerals identify identical elements and wherein:

DESCRIPTION OF THE PREFERRED EMBODIMENT

Figure 1:
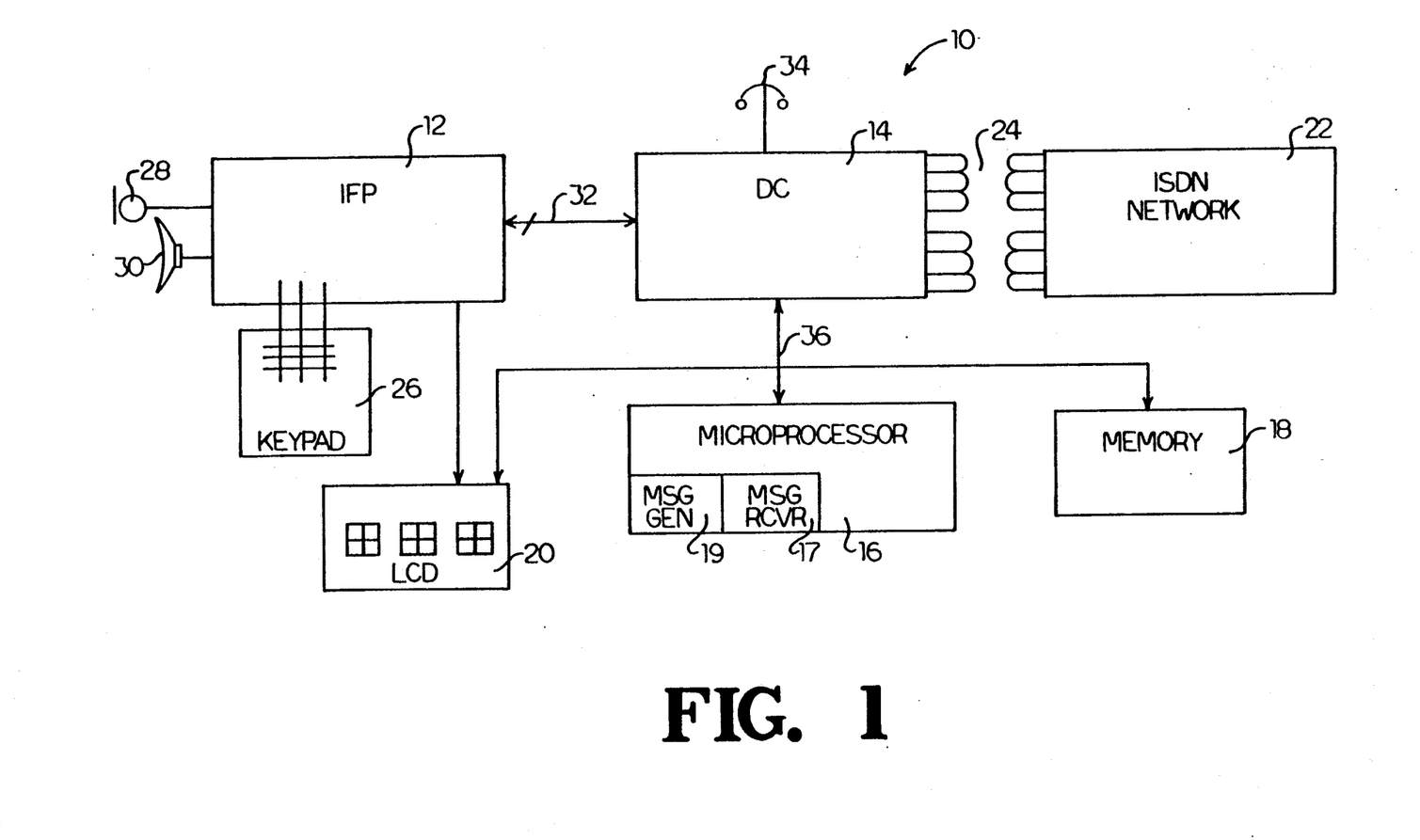
FIG. 1 is a block diagram of an ISDN telephone system embodying the present invention including an ISDN hands-free, multiple feature telephone unit embodying the present invention.

Referring now to FIG. 1, it illustrates in block diagram form, an ISDN telephone system 10 embodying the present invention. The system 10 generally includes a hands-free, multiple feature telephone unit 12, a digital controller 14, a microprocessor 16, a memory 18, and a liquid crystal display unit 20. The system 10 is transformer-coupled to an ISDN network 22 by a transformer 24.

The telephone unit 12 is coupled to a keypad 26 in a manner to be described in greater detail hereinafter. To that end, as will also be seen hereinafter, the unit 12 includes a keypad monitor for monitoring the keypad and identifying a particular key being depressed. Depression of the keys of the keypad 26 may be made for dialing a telephone number or for activating or deactivating particular features of the telephone unit 12. Also coupled to the unit 12 is a microphone 28 which serves to convert audible speech to analog voltage form and a loudspeaker 30 which serves to convert analog voltages representative of human speech to audible sound. The microphone 28 and speaker 30 may, of course, be contained in the same housing as the telephone unit 12. As will also be seen hereinafter, the telephone unit 12 includes an audio processor which converts the analog voltages produced by the microphone 28 representative of audible speech to output digital signals and which also converts input digital signals representative of human speech to analog voltages for conversion to audible sound by the speaker 30.

Figure 2:
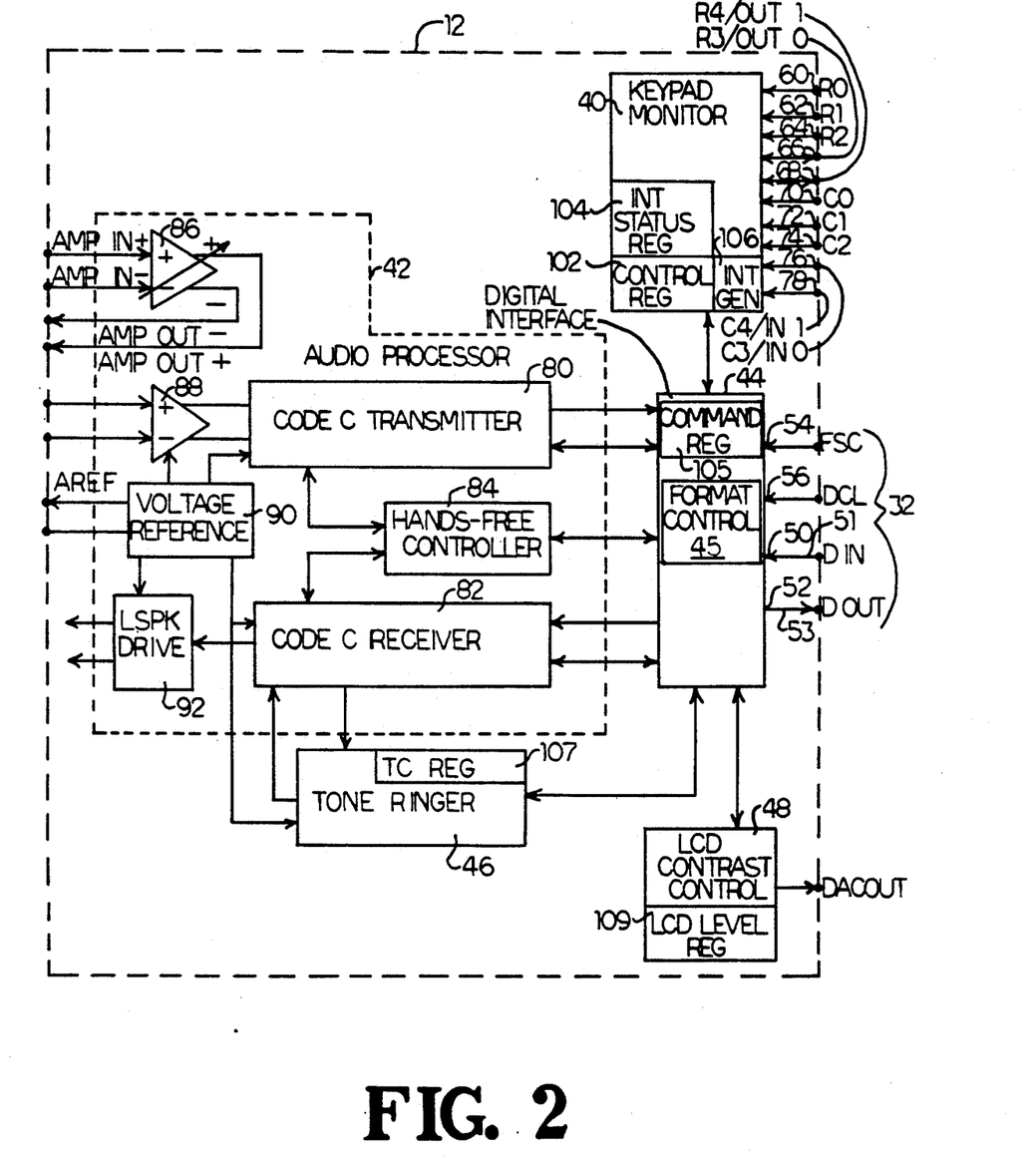
FIG. 2 is a block diagram of the hands-free, multiple feature telephone unit of FIG. 1 embodying the present invention.
Figure 3:
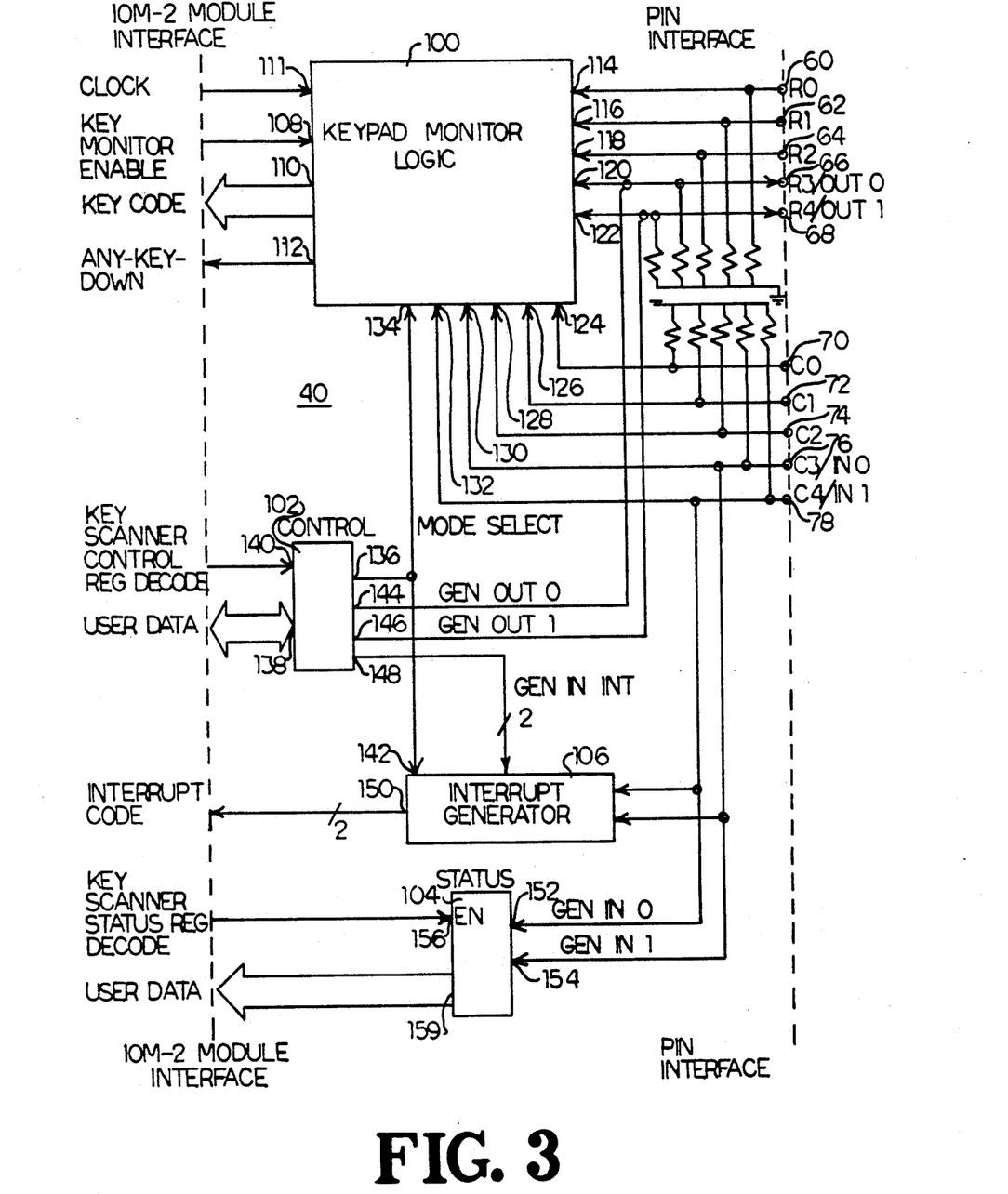
FIG. 3 is a block diagram of the keypad monitor of the hands-free, multiple feature telephone unit of FIG. 2 wherein interrupt conditions are detected.
Figure 4:
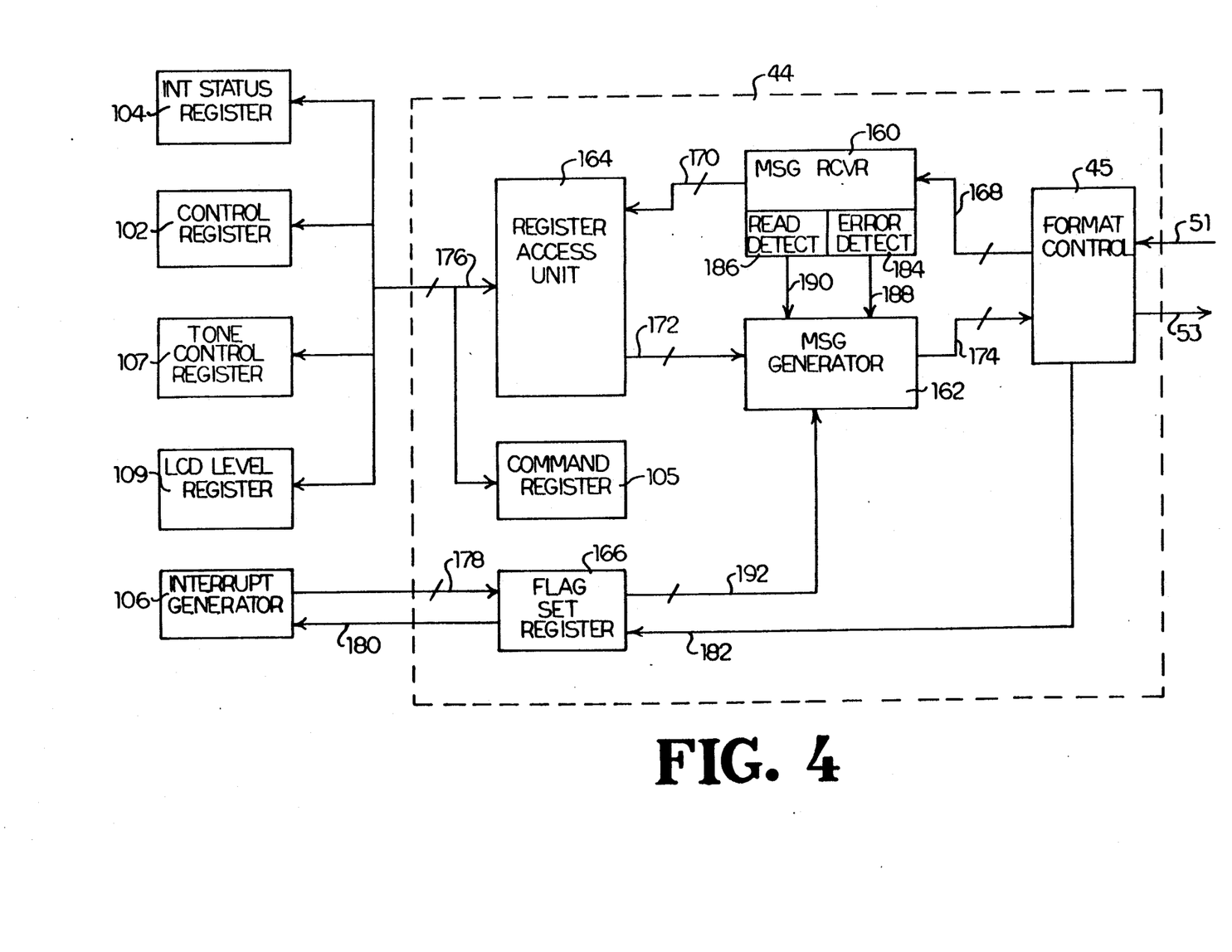
FIG. 4 is a block diagram illustrating a portion of a communication system embodying the present invention within the hands-free, multiple feature telephone unit of FIG. 2.

In accordance with the present invention, and as will be seen in FIGS. 2, 3, and 4, the telephone unit 12 further includes a plurality of registers for storing bits of data. Each of the registers is assigned a unique seven-bit address. These addresses are utilized for permitting the microprocessor 16 to access selected registers for writing data into the registers or reading data from the registers. As will also be seen hereinafter, the telephone unit (IFP) 12 is also assigned a unique four-bit address which is utilized in all messages sent from or sent to the telephone unit 12.

The telephone unit 12 is coupled to the digital controller 14 by a four-conductor bus 32. The bus 32 is preferably of the type well known in the art as an IOM-2 bus (IOM is a trademark of Siemens AG). The bus will be described in greater detail with respect to FIG. 2. It basically provides a full-duplex serial digital communication link between the telephone unit 12 and the digital controller 14.

The digital controller 14 provides a digital interface between the telephone unit 12 and the bus 32 to the ISDN network 22 and the microprocessor 16. The digital controller is preferably the Am79C30A Digital Subscriber Controller available from Advanced Micro Devices, Inc., the assignee of the present invention, and is well known in the art. It provides, in addition to the digital interface function, a CODEC transceiver function to support the use of a standard telephone handset 34 coupled thereto to enable the telephone user to communicate over the ISDN network 22 from the standard handset 34.

The liquid crystal display unit 20 is coupled to the telephone unit 12 and the digital controller 14. It functions to provide a display of, for example, a telephone number being dialed, the telephone number of an incoming call or an indication of various telephone unit features selected by the user such as hands-free, hold, speaker mute, et cetera.

The microprocessor 16 is coupled to the digital controller 14 over a microprocessor bus 36 which also couples the microprocessor to the memory 18 and the liquid crystal display unit 20. The microprocessor 16 executes programs stored in the memory 18 and thus provides the intelligence of the system 10. The microprocessor 16 allows the telephone system 10 to perform the functions customarily performed by such systems. It also responds to requests for service by the telephone user when the telephone user takes the telephone handset 34 off-hook or activates the telephone unit 12 by depressing one of the keys of the keypad 26. Such microprocessors and the programs which they execute are also well known in the art.

The microprocessor 16 further includes a message receiver 17 and a message generator 19 to permit the microprocessor to communicate with the telephone unit 12 over the microprocessor bus 36 through the digital controller 14, and over the serial bus 32. The message receiver 17 is arranged to receive error and interrupt messages from the telephone unit 12. Messages sent by the telephone unit 12 are multiple bit messages with the individual bits thereof placed onto the bus 32 in series within a predetermined channel referred to in the art as the "monitor channel" of the IOM-2 bus. The digital controller converts the serial bits to a parallel-bit format and conveys the parallel bits over the bus 36 to the message receiver 17 of the microprocessor 16.

The message generator 19 is arranged to generate register access messages for accessing selected ones of the registers within the telephone unit 12. The register access messages are multiple-byte messages with the bits of each byte being generated in parallel by the message generator 19. The parallel bit bytes are conveyed over the bus 36 to the digital controller 14 which then converts the parallel-bit bytes to serial-bit bytes and transmits the multiple-bit bytes in series over the bus 32 within the predetermined (monitor) channel. A format control within the telephone unit 12 then reconverts the serial-bit bytes to parallel-bit bytes for processing in a manner to be described hereinafter with respect to FIG. 4.

The register access messages generated by the message generator 19 can take two different forms. The first is a register write message and the second is a register read message. The formats of the register write and register read messages are illustrated below in Tables 1 and 2 respectively wherein the data is received lowest order byte, least significant bit first.

TABLE 1

| | Register Write Message Format | |
|---|---|---|
| Byte | MSB...LSB | Description |
| 0 | 1011 0000 | 1011 = IFP address, 0000 = register access code. |
| 1 | 0 \| ADDR | Bit 7 specifies a read (1) or write (0), bits 6-0 = internal register address |
| 2 | DATA 0 | Data to be written into the register {first (least significant) byte} |
| 3,... N-1 | --- | Intermediate data bytes of multiple byte access |
| N | DATA N | Last byte of a multiple byte access (Most significant byte) |

TABLE 2

Register Read Message Format

| Byte | MSB...LSB | Description |
|---|---|---|
| 0 | 1011 0000 | 1011 = IFP address, 0000 = register access code |
| 1 | 1 | ADDR | Bit 7 specifies a read (1) or write (0), bits 6-0 = internal register address |

As can thus be seen from the above, each register access message generated by the message generator 19 includes first and second multiple-bit bytes. The first byte includes a first number of four bits containing the multiple-bit address of the telephone unit 12 and a second number of four bits (0000) identifying the message as a register access message. The second byte includes a single bit identifying the message as a register read (1) or a register write (0) message and a third plurality of seven bits define the multiple-bit address of the register being accessed. The first two bytes of a register write message are immediately followed by a data message including one or more bytes of data to be written into the selected register. The first two bytes of a register read message are followed by a read response message from the telephone unit 12 in a manner to be described subsequently.

Referring now to FIG. 2, it illustrates the telephone unit 12 in greater detail. The telephone unit 12 generally includes the keypad monitor 40, an audio processor 42, a digital interface 44, a tone ringer 46, and a liquid crystal display contrast control 48. The functional units of the telephone unit 12 are all integrated into a single integrated circuit chip to form the telephone unit 12.

The telephone unit 12 includes the aforementioned plurality of registers to which the microprocessor is afforded access by the communications system of the present invention. These registers include a control register 102 and an interrupt status register 104 within the keypad monitor 40, a command register 105 within the digital interface 44, a tone control register 107 within the tone ringer 46, and a liquid crystal display level register 109 within the liquid crystal display contrast control 48. In a practical implementation of the telephone unit 12, additional registers may be provided including one or more registers within the audio processor 42. It is to be understood, therefore, that the registers illustrated in the figure are shown only for purposes of illustrating a preferred embodiment of the present invention.

The control register 102 is preferably an eight-bit register which is used to program the keypad monitor scan debounce time, to select an operating mode of the keypad monitor in a manner to be described hereinafter, and to control general purpose outputs in a manner also to be described hereinafter. Bit 7 of this register, when set, places the keypad monitor into an input/output mode which reduces the size of the keypad to be scanned for converting the use of two of the keypad monitor pins to output pins and two of the keypad monitor pins to input pins. This condition also enables the keypad monitor interrupt generator 106. When bit 7 of the control register is cleared, the keypad monitor 40 is arranged to monitor a full sized keypad. In this mode, the interrupt generator 106 is disabled. Bit 6 is reserved and is therefore written as a "0".

Bits 5 and 4 of the control register 102 program the keypad monitored debounce delay time during depression of a keypad switch and then again during release. Bit 3 of the control register 102 when set along with the mode select bit (bit 7), cause an interrupt message to be generated when an interrupt condition is detected at one of the general input keypad monitor pins. Similarly, when bit 2 of the control register is set along with the mode select bit (bit 7), another interrupt is generated in response to the detection of a change in the state of the other general input pin in detecting interrupt condition. The general input pins when the keypad monitor 40 is rendered in the input/output mode by the setting of the mode select bit are input pins 76 and 78.

When either of bits 1 or 0 of the control register 102 is set and the mode select bit is set, the corresponding output pin 68 or 66 respectively is forced to a high logic level. When either of these bits is cleared, its corresponding output pin is forced to a low logic level.

The interrupt status register 104 is also an eight-bit register which may be read by the microprocessor 16 to determine the state of the general purpose input pins 76 and 78. The register contents are valid only when the keypad monitor 40 is in the input/output mode. Bits 7 through 2 of the interrupt status register are not used and preferably written as zeros. Bits 1 and 0 of the interrupt status register reflect the current status of the general purpose input pins 76 and 78. Either bit is set if its corresponding input pin is at a high logic level and cleared if its corresponding input pin is at a low logic level.

The interrupt generator 106 is provided to generate a two-bit parallel code responsive to an interrupt condition being detected. More specifically, when the keypad monitor is rendered in the input/output mode, the second bit of the interrupt code will be a logical one when a change of state is detected at input pin 76 and the first bit will be a logical one if a change of state is detected at input pin 78.

The command register 105 of the format control 44 is used to control and enable various features of the telephone unit 12. It also is an eight-bit register. Bits 7 through 5 are used for a revision code which are read only. These bits are used for reading back the device hardware revision code of 000. This field must be written as zeros. Bit 4 of the command register 105 when set, returns the internal registers of the telephone unit 12 to their default values within a predetermined period of time. The software reset operation automatically clears this bit. Bit 3 of the command register 105 is used to enable the liquid crystal display contrast control 48. When bit 3 is set, the liquid crystal display contrast control is enabled. When bit 3 is cleared, the liquid crystal display contrast control 48 is disabled. Bit 2 of the command register 105 is used to enable the keypad monitor 40. When bit 2 is set, the keypad monitor is enabled. When bit 2 is cleared, the keypad monitor is disabled. Bit 1 of the command register 105 is used to enable the tone ringer 46. When bit 1 is set, the tone ringer is enabled. When bit 1 is cleared, the tone ringer is disabled. Lastly, bit 0 of the command register 105 enables the audio processor 42. When bit 0 is set, the audio processor is enabled, and when cleared, the audio processor is disabled.

The tone control register 107 of the tone ringer 46 is an eight-bit register. Bits 7 through 3 are used to select the warble rate, bit 2 is reserved and is preferably written to zero 0, and bits 1 and 0 are used to select the tone ringer sequence.

Lastly, the liquid crystal display level register 109 of the liquid crystal display contrast control 48 controls the output voltage of the liquid crystal display driver. It also is an eight-bit register with bits 7 through 4 reserved and preferably written as zeros and bits 3 through 0 being used to select an active tap on a resistive divider network for selecting the liquid crystal display driver output voltage.

The digital interface 44 includes a format control 45 which provides a serial digital interface between the functional modules of the telephone unit 12 and the digital controller 14 over the four-conductor bus 32. It therefore is arranged to convert outgoing parallel bits to outgoing serial bits and places the outgoing serial bits within a predetermined channel of the bus 32. It also is arranged for extracting incoming serial bits from the predetermined channel of bus 32 and converting the incoming serial bits to parallel bits for processing within the telephone unit 12. As previously mentioned, the predetermined channel for messages is the IOM-2 monitor channel. The format control 45 includes an input 50 coupled to bus conductor 51 for receiving serial digital data from the digital controller 14 and an output 52 coupled to bus conductor 53 for conveying serial digital data to the digital controller 14. The signals carried on the incoming bus conductor 51 and outgoing bus conductor 53 are multiplexed with the same channel structure comprising three repetitively conveyed thirty-two bit frames. The frame structure is well known in the art. Each frame comprises a plurality of channels which include serial digital representations of received or transmitted speech, data to be entered into register, data to be read from register, register addresses, keypad information such as a six-bit indication of a particular key being depressed, and other control information.

To provide synchronization for the data transfer, the digital interface 44 includes an input 54 (FSC) for receiving frame synchronizing signals at an 8 kilohertz rate from the digital controller 44 and an input 56 (DCL) for receiving clock signals at a 1.536 megahertz rate from the digital controller 14 for synchronizing the transmission and the reception of the individual bits of data.

In keeping with strict power requirements for such telephone units when not in use, the telephone unit 12 is in a deactivated state when not in use for conserving power. When no data is being transferred between the telephone unit 12 and the digital controller 14 or when the telephone unit 12 is deactivated, the data output 52 is held high. The telephone unit 12 is activated when a keypad switch of the keypad is depressed or closed causing the keypad monitor 40 to provide an any key down indication. This causes the data output 52 to be pulled low to in turn cause the digital controller 14 to provide the aforementioned clock signals. Upon receipt of the clock signals, the telephone unit 12 is activated permitting the keypad monitor to scan its input terminals to determine which key is depressed. Also, at any other time data is to be transferred, the data output 52 is momentarily pulled low.

The keypad monitor 40 includes a first plurality of inputs coupled to input terminal pins 60, 62, 64, 66 and 68 which are arranged to be coupled to a first plurality of keypad switch conductors (row conductors) and a second plurality of inputs coupled to input terminal pins 70, 72, 74, 76 and 78 which are arranged to be coupled to a second plurality of keypad switch conductors (column conductors). Since there are five inputs for row conductors and five inputs for column conductors, the keypad monitor, when operative in the full keypad monitor mode, is capable of monitoring all of the input terminals and thus, is capable of monitoring a full-sized keypad comprising twenty-five keypad switches.

When the keypad monitor 40 is operative in the input/output mode, the keypad monitor monitors input terminals 60, 62, 64, 70, 72 and 74. Hence, in the input/output mode, there are three row inputs and three column inputs for monitoring a keypad comprising nine keypad switches. Also, and as previously mentioned, when the keypad monitor is in the input/output mode, terminal pins 66 and 68 are converted to general outputs, not associated with keypad monitoring, and terminal pins 76 and 78 are converted to general inputs for detecting interrupt conditions, a function also not associated with keypad monitoring.

Each keypad switch is coupled between a respective different pair of row and column conductors. When a keypad switch is depressed or closed, the keypad monitor 40, after providing the aforementioned any key down indication and receiving the clock signals from the digital controller 14, then scans the input terminals and senses for a condition which indicates which keypad switch is closed. After detecting which keypad switch is closed, the monitor pauses to account for key bounce and then generates a 6-bit code representative of the keypad switch which is closed. The 6-bit code is conveyed to the format control 45 which then places the code into its proper channel and conveys the code to the digital controller 14 on conductor 53 of the four-conductor bus 32 from the format control output 52.

The audio processor 42 includes a CODEC transmitter 80, a CODEC receiver 82, a hands-free controller 84, a variable gain amplifier 86, a fixed gain amplifier 88, a voltage reference 90, and a loudspeaker drive 92. The audio processor 42 thus provides all of the audio processing within the telephone unit 12.

The CODEC transmitter 80 receives analog voltages representative of audible speech from the fixed gain amplifier 88. The fixed gain amplifier 88 includes a pair of inputs which may be directly coupled to an external microphone or coupled to the external microphone through the variable gain amplifier 86. Preferably, the microphone is capacitively coupled to the telephone unit 12 at the inputs of either the variable gain amplifier 86 or the fixed gain amplifier 88. If the variable gain amplifier 86 is utilized, its outputs should preferably be capacitively coupled to the inputs of the fixed gain amplifier 88 through external capacitors.

The CODEC transmitter 80 after receiving the audio voltages representative of human speech, digitizes the analog voltages into an 8-bit digital word and conveys the same to the format control 45. The format control 45 then serializes the digital word received from the CODEC transmitter and places the same into the appropriate channel for transmission to the digital controller from the output 52.

The CODEC receiver 82 includes a digital-to-analog converter which converts the 8-bit digital words received from the format control 45 representative of received human speech and converts the same to analog voltages. The received audio is received by the format control 45 at input 50 in serial bit format and converts the same to 8-bit parallel bit words for conversion to analog form by the CODEC receiver 82. The CODEC receiver 82 is coupled to the loudspeaker drive 92 which includes an amplifier for amplifying the analog voltages representative of received human speech. The loudspeaker drive 92 is adapted to be coupled to the external speaker 30 (FIG. 1) for reproducing the received audio.

The tone ringer 46 is coupled to the CODEC receiver 82. The tone ringer provides ringing tones in digital format which are also converted to analog form by the CODEC receiver. The analog voltages representative of the ringing tones are then conveyed to the loudspeaker drive 92 for reproduction by the external speaker coupled to the loudspeaker drive 92. The tone ringer 46 is preferably programmable by the register 107 contained within the tone ringer 46 to permit a plurality of different distinguishable rings to be produced. The bits of the register 107 may be set by the microprocessor.

Lastly, the liquid crystal display contrast control 48 provides an output voltage for the liquid crystal display to adjust the contrast thereof. The liquid crystal display contrast control 48 is coupled to the digital interface 44 and is controllable by the register 109, as previously explained, which may be programmed to provide a desired output voltage.

The hands-free controller 84 is coupled between the CODEC transmitter 80 and CODEC receiver 82. The hands-free controller 84 controls the enablement of the CODEC transformer and CODEC receiver to provide hands-free simplex operation of the telephone unit 12. The hands-free controller 84 is coupled to the digital interface 44 for receiving control signals therefrom.

Referring now to FIG. 3, it illustrates the keypad monitor 40 in greater detail. The keypad monitor 40 generally includes keypad monitor logic 100, the control register 102, the status register 104, and the interrupt message generator 106.

The keypad monitor logic 100 includes a clock input 111 for receiving clock signals from the digital interface 44, a key monitor enable input 108 for receiving enable signals from the command register 105 of the digital interface 44, an output 110 for providing the digital interface 44 with the 6-bit digital representation of a keypad switch being closed, and another output 112 for providing the digital interface 44 with the aforementioned any key down indication. The keypad monitor also includes the first plurality of inputs 114, 116, 118, 120, and 122 which are coupled to terminal input pins 60, 62, 64, 66, and 68 respectively. The keypad monitor logic also includes the second plurality of inputs 124, 126, 128, 130, and 132 which are coupled to the input terminal pins 70, 72, 74, 76, and 78, respectively. Lastly, the keypad monitor logic includes an input 134 which is coupled to the output 136 of the control register 102 which controls whether the keypad monitor 40 is in the full or input/output mode of operation.

The control register 102 includes an input 138 for reading control data from or writing control data into the register 102. The control register includes another input 140 for receiving the seven-bit address of the control register to enable the control register to be properly programmed to set the keypad monitor into the full or input/output mode of operation. For example, when the first mode of operation is selected, the output 136 will provide a high level to input 134 of the keypad monitor logic and a high level to an input 142 of the interrupt generator 106. When the keypad monitor is to operate in the input/output mode, the control register 102 will provide at output 136 a low level to input 134 of the keypad monitor logic and to the input 142 of the interrupt generator 106.

The control register 102 includes another output 144 coupled to input 120 of the keypad monitor logic and an output 146 coupled to input 122 of the keypad monitor logic. These outputs, when the keypad monitor is operative in the input/output mode, provide a high logic level to the inputs 120 and 122 when these outputs are used for general outputs and thus enable the inputs 120 and 122 to be used as general outputs as previously described.

The control register includes a further output 148 which is coupled to the interrupt generator 106. The output 148 allows the interrupt generator 106 to be enabled when the keypad monitor is in the input/output mode of operation to permit the interrupt generator 106 to generate interrupt messages responsive to the input conditions at pins 76 and 78. If during the input/output mode of operation the input pins 76 and 78 are to be used for purposes other than to generate interrupt messages, the interrupt generator 106 would not be enabled by the output 148. The interrupt generator 106 has an output 150 for providing the two-bit interrupt messages. The output 150 is coupled to the digital interface 44 to cause an eight-bit interrupt message to be conveyed to the digital controller 14 and the microprocessor 16 in a manner to be described hereinafter.

The status register 104 includes a pair of inputs 152 and 154 coupled to input terminals 76 and 78 respectively. The status generator 104 also includes an input 156 for receiving its seven-bit address and enabling the status information contained therein to be read as to the condition of pins 76 and 78 over an output 159. The output 159 is coupled to the digital interface 44 so that the status of the status register 104 may be read by the microprocessor 16.

Referring now to FIG. 4, it illustrates the portion of the communication system embodying the present invention which resides within the telephone unit 12. More specifically, FIG. 4 illustrates the interrupt status register 104, control register 102, tone control register 107, liquid crystal display level register 109, and command register 105 which have been previously described.

The digital interface 44 includes the format control 45, a message receiver 160, a message generator 162, a register access unit 164, and a flag set register 166. Also, illustrated in FIG. 4 is the interrupt generator 106 which is coupled to the flag set register 166.

The format control 45 is coupled to the message receiver 160 by an eight-bit parallel bus 168. The message receiver 160 is coupled to the register access unit 164 by another eight-bit parallel bus 170. The register access unit 164 is also coupled to the message generator 162 by a further eight-bit parallel bus 172 and the message generator 162 is coupled to the format control 45 by a still further eight-bit parallel bus 174. For accessing the registers, and to enable the reading of the register contents and writing of data into the registers, the register access unit 164 is coupled to interrupt status register 104, the control register 102, the tone control register 107, the liquid crystal display level register 109, and the command register 105 by a bi-directional eight-bit parallel bus 176. The interrupt generator 106 is coupled to the flag set register 166 by a two-bit parallel bus 178 and by a conductor 180. Lastly, the format control 45 is also coupled to the flag set register 166 by a conductor 182.

The message receiver 160 includes an error detector 184 and a read operation detector 186. As will be described hereinafter, the error detector 184 detects for errors in the register access messages received from the microprocessor and in response to detecting an error in a register access message, causes the message generator 162, by providing a signal over a line 188, to generate an eight-bit error message to be described hereinafter.

The read detector 186 detects if a register access message is a register read message. In doing so, the read detector detects whether bit 7 of the second register access message byte is a 1 or a 0. If it is a 1, the read detector will enable the message generator 162 by providing a signal over a line 190, to format a read response message which is formatted in a manner to be described hereinafter.

When the telephone unit receives a register access message at the format control 45 over the incoming IOM-2 bus monitor channel on bus conductor 51, the format control 45 converts the serial bits of the incoming message to eight-bit parallel bit bytes. As previously described, the incoming messages are in serial bit form with each eight-bit byte being received in successive frames. The first byte includes a first four-bit portion which contains the telephone unit four-bit address, and a second four-bit portion which will contain all zeros indicating that the incoming message is a register access message. The second byte received by the format control will include a single bit (bit 7) which indicates whether the register access message is a register read or a register write. If the message is a register read, the read detector 186 detects a logical one as bit 7 of the second byte and enables the message generator 162 for generating a read response message. The remaining seven bits of the second byte contains the seven-bit address of the register being accessed. The message receiver 160 conveys the seven-bit address of the register to be accessed to the register access unit 164 over the eight-bit parallel bus 170. The register access unit then decodes the seven-bit address of the register to be accessed and provides the register to be accessed with an access signal over the eight-bit parallel bus 176. This enables the register to be accessed for the reading of its contents. The register access unit 164 receives the contents of the accessed register over the bi-directional bus 176 and translates it to the message generator over the eight-bit parallel bus 172. The message generator then generates a read response message which has the format shown below in table three.

TABLE 3

Read Response Message Format

| Byte | MSB ... LSB | Description |
|------|-------------|-------------|
| 0 | 1011 0000 | 1011 = IFP address, 0000 = register access code |
| 1 | DATA 0 | Data read from the register (first byte, least significant byte) |
| 2, ... N-2 | - - - | Intermediate data bytes of multiple byte access |
| N | DATA N | Last byte for a multiple byte access. (last byte, most significant byte) |

As can be seen from Table 3 above, the read response message includes at least two bytes. The first byte (byte 0) includes a first four-bit portion which contains the four-bit address of the telephone unit, and a second four-bit portion which contains all zeros indicating the read response message is in response to a register access message. The second and succeeding bytes of the read response message contain the data field of the particular register being read. For single byte registers, the data field is one byte long. For multiple byte registers, the data field is as many bytes long as the register is deep. The message generator 162 conveys the read response message bytes to the format control in series with the bits of each read response message byte being in parallel over the eight-bit parallel bus 174. The format control 45 converts the parallel bits of each of the read response message bytes into serial bits and places each of the bytes within the outgoing monitor channel of the IOM-2 bus on the outgoing bus conductor 53. After all of the read response message bytes have been sent in consecutive frames, the message generator will cause, for the next two successive frames, the monitor channel to be idle to indicate to the microprocessor that the read response message has been completed.

If the incoming register access message is a register write message, the read detector 186 will detect a 0 in bit 7 of the second byte of the register write message and will not enable the message generator 162. The seven-bit address of the register to be accessed is conveyed to the message receiver 160 and then to the register access unit 164 over the eight-bit parallel bus 170. The register access unit 164 then decodes the address of the register to be accessed and provides that register with an access signal over the bi-directional eight-bit parallel bus 176, to enable the particular register to be accessed. With the register to be accessed now enabled, the successive data bits of the register write message, which have been converted from serial bit to parallel bit form by the format control 45, are conveyed from the message receiver 160 to the register access unit 164 and then to the particular register which is to receive the data. After the register write message is completed, the microprocessor will cause the incoming monitor channel to be idle for two successive frames to indicate to the format control 45 that the register write message has been completed.

As previously mentioned, the error detector 184 detects errors in the register access messages. When the error detector 184 detects an error in a register access message, it causes the message generator 162 to generate an error message by providing a signal over line 188. The error message is a predetermined eight-bit single byte error message which is conveyed with the bits in parallel to the format control 45. The format control 45 then converts the parallel bits of the error message to serial bits and places these bits in series into the outgoing monitor channel of the IOM-2 bus on the outgoing bus conductor 53.

The error message is generated for any one of three error conditions. The first condition is when a register write message is received and is not followed by an address and the correct number of data bytes. In this case, the message generator returns the error message in the outgoing monitor channel and causes the format control to go to a reset state in which it looks for the start of the next message. The second condition is when the first byte of a register read message is received and is followed by an end-of-transmission, that is, by two successive frames in which the monitor channel is idle. In this case, the message generator returns the error message and causes the format control to go through the reset state. The third and last condition is when more than two bytes are received in a register read message. In this case, the message generator returns the error message in the outgoing monitor channel of the IOM-2 bus and causes the format control to abort the read operation.

Lastly, as previously described, the interrupt generator 106 detects interrupt conditions at the two input pins of the keypad monitor when the keypad monitor is programmed in the input/output mode. Upon detecting a change of state at one of these input pins, indicating an interrupt condition, the interrupt generator 106 generates a two-bit indication of the interrupt condition and conveys the same to the flag set register over the two-bit parallel bus 178. The two-bit interrupt condition indication indicates at which input pin the interrupt condition was caused. Upon receiving the two-bit interrupt condition indication, the flag set register 166 sets an internal flag and then conveys the two-bit interrupt condition indication to the message generator 162 over the two-bit parallel bus 192. Upon receiving the two-bit interrupt condition indication, the message generator 162 will generate an interrupt message. The interrupt message is preferably a single byte eight-bit message wherein a first four-bit portion contains the four-bit address of the telephone unit and the second four-bit portion indicates the source of the interrupt condition. The indication of the source of the interrupt condition indicates at which keypad monitor input terminal the interrupt condition was caused. Also, although not illustrated, the audio processor may also generate interrupt conditions and the second portion of the interrupt message would then include a four-bit code indicating that the interrupt condition originated within the audio processor. Such an interrupt condition may be caused, for example, by limiter overflows within the audio processor.

The eight-bit single byte interrupt message is then conveyed to the format control 45 over the eight-bit parallel bus 174. The format control 45 then converts the parallel bits to serial bits and places the bits of the single interrupt message byte in series within the monitor channel of the IOM-2 bus on the outgoing bus conductor 53.

Preferably, the microprocessor is arranged to provide an acknowledgement message to acknowledge the receipt of the interrupt message. To this end, the IOM-2 bus includes a single-bit MR channel which is rendered active by the microprocessor in acknowledgment of receiving the interrupt message. The active MR channel is received by the format control 45 from the incoming bus conductor 51 and conveys the same to the flag set register 166 which then clears its interrupt flag. The flag set register 166, over line 180, then causes the interrupt acknowledgment to be conveyed to the interrupt generator to cause the interrupt generator to reset.

While a particular embodiment of the present invention has been shown and described, modifications may be made, and it is therefore intended to cover in the appended claims all such changes and modifications which fall within the true spirit and scope of the invention.

What is claimed is:

1. In a system of the type including a microprocessor and a device external to said processor, wherein said device has a multiple-bit address and includes a plurality of registers for storing bits of data wherein each said register has a unique multiple-bit address, and wherein said microprocessor is coupled to said external device by a serial bus, a communication system, permitting said microprocessor access to said registers, said system comprising:

message generator means within said microprocessor for generating a register access message comprising first and second multiple-bit bytes, said first byte including a first number of bits containing said multiple-bit address of said external device and a second number of bits identifying said message as a register access message, and said second byte including a single bit identifying said message as a register read or register write message and a third plurality of bits defining the multiple-bit address of the register being accessed;

transmitting means coupled to said microprocessor for transmitting said first and second multiple-bit bytes in series over said serial bus;

receiving means within said external device and coupled to said serial bus for receiving said register access message;

register access means within said external device coupled between said receiving means and said registers for decoding said third plurality of bits and providing an access signal to said accessed register corresponding to the multiple-bit register address defined by said plurality of bits and for receiving or changing contents of said accessed register depending upon status of said single bit in said second byte; and message generator means within said external device for generating a read response message including said first byte when said register access message is a register read message.

2. A system as defined in claim 1 further including formatting means coupling said receiving means to said serial bus for converting said serial bytes to parallel bytes.

3. A system as defined in claim 2 wherein said transmitting means are arranged for transmitting said first and second bytes within a predetermined channel and wherein said formatting means are arranged for obtaining said bytes from said predetermined channel.

4. A system as defined in claim 3 wherein said message generator means are arranged for generating a data message including at least one multiple-bit data byte following said register access message when said register access message is a register write message, wherein said transmitting means are arranged for transmitting said data message over said serial bus within said predetermined channel, and wherein said register access means are arranged for conveying said data message to said accessed register.

5. A system as defined in claim 1 wherein said external device comprises a telephone unit.

6. A system as defined in claim 5 wherein said message generator is coupled to said formatting means and wherein said formatting means are arranged to place said read response message onto said serial bus within said predetermined channel.

7. A system as defined in claim 6 wherein said message generator is coupled to said receiving means and wherein said receiving means are arranged to enable said message generator for generating said read response message responsive to said single bit identifying said register access message as a read message.

8. A system as defined in claim 7 wherein said message generator is coupled to said register access means for obtaining the contents of said accessed register for generating said register read message.

9. A system as defined in claim 6 wherein said read response message includes said first byte and at least one additional byte containing the contents of said accessed register.

10. A system as defined in claim 5 wherein said receiving means are arranged for detecting errors in said register access messages and wherein said message generator is arranged to generate a predetermined error message in response to said receiving means detecting an error in one of said register access messages.

11. A system as defined in claim 10 wherein said message generator is coupled to said formatting means and wherein said formatting means are arranged to place said error message onto said serial bus within said predetermined channel.

12. A system as defined in claim 11 wherein said error message is a multiple-bit, single byte message.

13. A system as defined in claim 10 wherein said receiving means are arranged to cause said message generator to generate said error message when said receiving means detects that said register write message does not include said third plurality of bits.

14. A system as defined in claim 10 wherein said receiving means are arranged to cause said message generator to generate said error message when said receiving means detects that said register read message does not include said second byte.

15. A system as defined in claim 10 wherein said receiving means are arranged to cause said message generator to generate said error message when said receiving means detects that said register read message comprise more bytes than said first and second bytes.

16. A system as defined in claim 5 wherein said external device includes means for detecting an interrupt condition coupled to said message generator for causing said message generator to generate an interrupt message responsive to the detection of an interrupt condition.

17. A system as defined in claim 16 wherein said message generator is coupled to said formatting means and wherein said formatting means are arranged to place said interrupt message onto said serial bus within said predetermined channel.

18. A system as defined in claim 17 wherein said interrupt message is a multiple-bit, single byte message including a first portion containing the address of said external device and a second portion defining the source of said interrupt condition.

19. A system as defined in claim 16 wherein said external device further includes flag setting means coupling said means for detecting an interrupt condition to said message generator for setting an interrupt flag in response to the detection of an interrupt condition.

20. A system as defined in claim 19 wherein said microprocessor is arranged to provide an acknowledgement message to acknowledge receipt of said interrupt message and wherein said flag setting means is arranged to reset said interrupt flag in response to receiving said acknowledgement message.

21. A system as defined in claim 20 wherein said acknowledgement message is a 1-bit message within a second predetermined channel on said serial bus.

* * * * *